Aug. 10, 1965 S. M. C. V. SIMON ETAL 3,200,307

ALTERNATING CURRENT SIGNAL RECEIVER

Filed June 11, 1962

Inventor
S. SIMON-M.BOEVE
By [signature]
Attorney

United States Patent Office 3,200,307
Patented Aug. 10, 1965

3,200,307

ALTERNATING CURRENT SIGNAL RECEIVER

Stephane Marcel Clement Victor Simon and Marcel Corneel Boeve, Antwerp, Belgium, assignors to International Standard Electric Corporation, New York, N.Y., a corporation of Delaware Filed June 11, 1962, Ser. No. 201,699
Claims priority, application Belgium, June 15, 1961, 40,732, Patent 605,013
9 Claims. (Cl. 317—147)

This invention relates to alternating current signal receivers and more particularly to receivers of low frequency alternating current signals.

Receivers of this type are, for instance, used during signalling operations between automatic telephone exchanges. In an exemplary system, a 50 c.p.s. signal controls the establishment of communication channels or paths. The sensitivity of these receivers must be adequate to correctly receive signals transmitted over a long line without requiring the use of an excessively high input voltage. Previously, this sensitivity requirement has entailed the use of particularly sensitive relays as load element at the receiving end of the line. Unfortunately, however, these relays necessitate the use of a device which compensates for variations in the length of the line because the current in the relay must be closely limited. Otherwise signals are distorted, or the relay loses adjustment.

Another important problem is that a very sensitive relay sometimes remains operated under the influence of the trains of oscillations following each signal pulse or element. Thus, the relay is not always released at the moment when the next signal pulse or element is received. This completely disturbs the reception.

Accordingly, an object of the present invention is to free the above described receiver from the problems encountered when very sensitive relays are used.

According to one aspect of the invention, the receive relay is controlled by an input circuit tuned to the frequency of the alternating signal current, 50 c.p.s. in the example noted. This input circuit includes a capacitor and a primary winding inductively coupled to a secondary winding to apply the energy received over the line to the receive relay. A midtapping of the secondary winding is grounded via a resistor in parallel with a capacitor. The two ends of the secondary winding are connected to the first terminals of two diodes respectively. The second terminals of these two diodes are connected to a first electrode (for instance, the emitter) of a transistor having a grounded second electrode, which may be the base. The time constant of the circuit formed by the resistor and capacitor is equal to or greater than the damping time of the transient oscillations which may be received over the line and induced in the secondary winding. Thus the signal current rectified by the diodes will charge the capacitor to a voltage proportional to the amplitude of the received signal. This provides an automatic matching of the capacitor charge to the level of the signal received. On the other hand the damped, transient oscillations following the signal will have no influence on the following part of the receiver.

According to another aspect of the invention, a third electrode (such as the collector), of the transistor is connected to a second time constant circuit and a trigger circuit. The trigger circuit comprises a delay circuit for causing variations of an output current which determines the action of one or more elements associated therewith. The time constant of the delay circuit is larger than that of the second time constant circuit.

As will become more apparent, spurious signals of short duration such as transient oscillations cannot operate the trigger circuit. Furthermore, the output signal always takes the form of either of two distinct electrical states with the exclusion of any intermediate state.

The above mentioned and other objects and features of the invention will become more apparent and the invention itself will be best understood by referring to the following description of embodiments taken in conjunction with the accompanying drawings in which.

Figure 1:
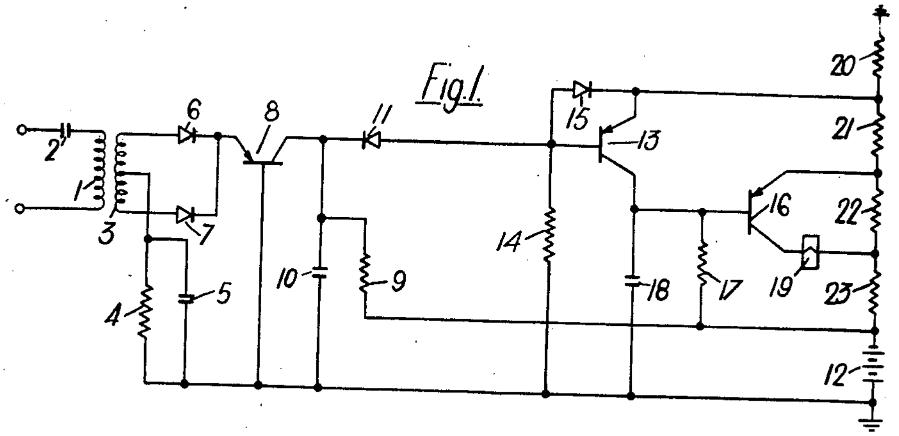
FIG. 1 is a schematic circuit diagram incorporating the principle of the invention.

In a preferred embodiment of the invention, the receiver comprises an input circuit tuned to the frequency to be received e.g. 50 c./s. This input circuit includes a primary winding 1 of a transformer in series with the capacitor 2. A secondary winding 3 of this transformer is provided with a midtapping which is grounded via the resistance 4 connected in parallel with the capacitor 5. The outer terminals of the secondary winding 3 are connected to the anodes of two diodes 6 and 7. The cathodes of these diodes are both connected to the emitter of a first transistor 8. The base of this transistor is grounded. The collector of transistor 8 is connected to battery 12 via a resistor 9, to ground via a capacitor 10, and to the cathode of a diode 11. The anode of the diode 11 is connected to the base of a second transistor 13, to ground via resistor 14, and to the anode of a diode 15. The cathode of diode 15 is connected to a voltage divider 20–23 which provides various biasing potentials. The collector of transistor 13 is connected directly to the base of a third transistor 16, to battery via resistor 17, and ground via a capacitor 18. The collector of transistor 16 is connected to control the energization of a signal device, here shown as relay 19, and the emitter to the voltage divider 20–23. All three transistors are biased to operate as electronic switches. The circuit of relay 19 is completed to the junction point of resistors 22 and 23.

The circuit operation will be explained next. A 50 c./s. alternating current signal received over the line is inductively transmitted to the secondary winding 3. During each of the half-waves induced in winding 3 one of the diodes 6 or 7 becomes conductive. Then the electrons coming from the emitter of transistor 8 flow toward the capacitor 5 and charge the upper plate negatively via the midtapping of the secondary winding 3. In the absence of resistor 4, this charge would automatically reach a voltage equal to the peak voltage appearing at the terminals of each half of the secondary winding, and then the flow of electrons would practically disappear. But resistor 4 allows a certain discharge of the capacitor so that at the peak of each half-wave a short current pulse is generated which compensates the loss of charge of capacitor 5, as shown by the solid line 24 on FIG. 3, this loss being due to leakage through resistor 4.

Figures 2, 3, 4:
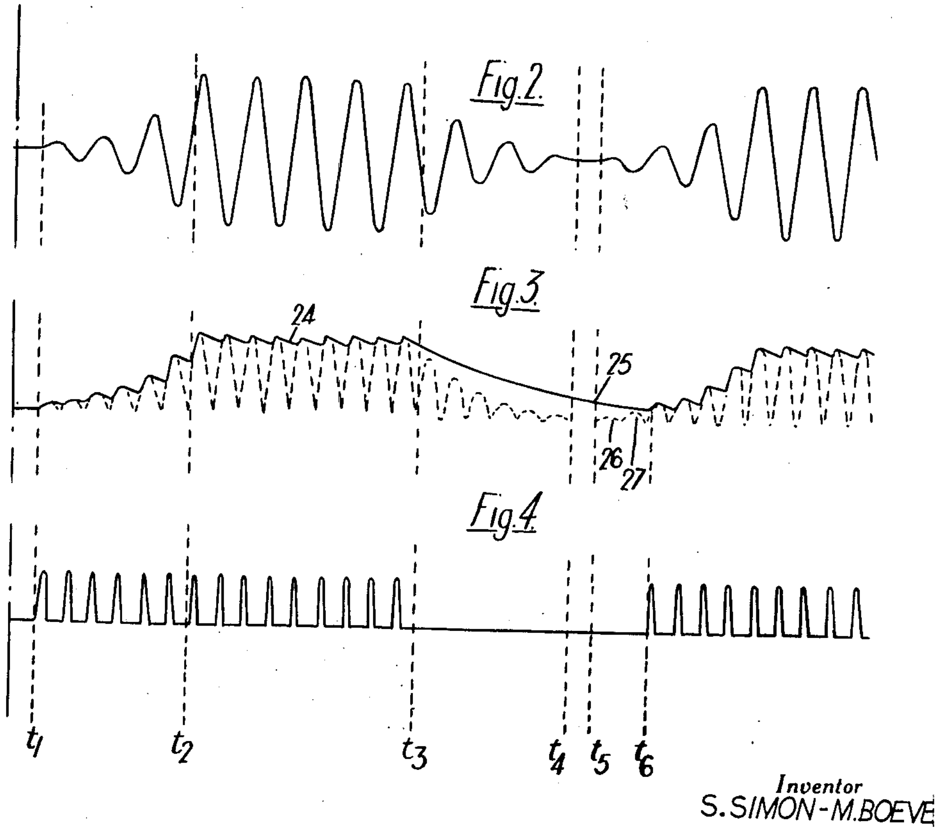
FIG. 2 is a voltage curve which represents a signal that is received over a line.
FIG. 3 shows the voltage wave form appearing at the terminals of the first time constant circuit.
FIG. 4 represents the current pulses appearing at the emitter of the first transistor.

During these current pulses, shown in FIG. 4, transistor 8 draws current and discharges capacitor 10. Thus, the negative bias potential which was applied from the charged capacitor 10 to the base of transistor 13 via the diode 11 decreases. Transistor 13 is cut-off. This causes the operation of the signal device relay 19, in a manner which will be explained later.

At the same time that capacitor 10 is discharged, the diode 11 is back biased thus separating the components 9 and 10 from the components 13, 14 and 15. This prevents the components 13–15 from affecting the time constant of the circuit formed by the components 9 and 10. The voltage at the junction of resistors 20, 21 is applied through diode 15 to maintain the anode of diode 11 at a negative potential to prevent this diode from conducting any very small negative voltage appearing at its cathode. The transistor 13 is normally cut-off for low amplitude input signals. On the other hand, if during large amplitude signals the current pulses shown in FIG. 4 become larger than can be delivered via the collector of transistor 8, clipping occurs. Hence the influence on the transistor 13 will remain the same.

Another important feature of the invention is the suppression of the troublesome effect caused by transient oscillation trains appearing at the end of each signal element. These trains are represented in FIG. 2 between $t_3$ and $t_4$, they are produced by the oscillations in the input circuit (capacitor 2 and winding 1). Also other components of the transmission circuit do not instantaneously stop oscillating when the alternating signal current is stopped.

To prevent response during the damping time of the transient oscillation trains, the time constant of the circuit formed by capacitor 5 and resistor 4 is calculated so that the speed of the voltage decrease as capacitor 5 discharges is at least slightly smaller than the speed of the amplitude damping or decrease of the half-wave parts of the transient oscillation train. Stated another way, as represented on FIG. 3 ($t_3$–$t_4$) the capacitor 5 does not recharge responsive to the decaying oscillations. In these conditions, as soon as the amplitude of the half waves decreases sufficiently, the diodes 6 and 7 become back biased. This condition remains during the whole duration of the decreasing half waves, and no current pulse is produced in the transistor 8 as may be seen on FIG. 4 between $t_3$ and $t_4$. Thus, the capacitor 10 immediately starts recharging as if the damped wave were not existing.

It should also be noted that the present circuit arrangement realizes partial correction of the distortion when the latter consists of a too short space ($t_3$–$t_5$) between the signal elements. Indeed, just as transient oscillation trains occur at the trailing edge of the signal elements, so transient oscillation trains occur at the leading edge of the signal in which the amplitude of the half waves increases. Such a leading edge transitory period is represented between $t_1$ and $t_2$ on FIG. 2.

If the capacitor 5 is not charged at the moment when a signal element begins (time $t_1$) current pulses will flow through transistor 8 from the first half-wave on and continuing to time $t_3$ when the signal element ends (FIG. 4 from $t_1$ to $t_2$). However, if the leading edge of a signal element follows too closely behind the preceding one, as shown between $t_3$ and $t_5$, capacitor 5 will not have been discharged sufficiently at the moment the signal element starts; a charge 25, remaining on the capacitor 5 prevents the transistor 8 from conducting during the first half waves of low amplitude such as 26 and 27. Thus, a certain automatic prolongation $t_5$–$t_6$ of the space between the signal elements results so that the problem of a too short space is partially corrected.

The operation of transistors 13 and 16, of relay 19, and of the associated circuits will now be considered. This part of the receiver constitutes a trigger circuit. That is, for a progressive variation of the control current in the line connected to winding 1, the current flowing through the relay winding varies in a non-progressive manner from the one to the other of two values. For example, either the winding current is zero and the relay is released or the winding current is sufficiently large and the relay is operated. The relay is not able to maintain itself at any intermediate value.

In greater detail, it should be noted that the transistors 13 and 16 are biased from the same voltage divider circuit 20–23. Thus, voltage variations are produced at the emitter of transistor 13 responsive to the insertion of resistor 22 by transistor 16. In the absence of a signal, the transistor 13 is conductive, due to the negative bias voltage applied to its base bia resistor 9 and diode 11. The potential of the transistor 13 collector and of the transistor 16 base is more positive than the potential of the transistor 16 emitter, due to the voltage drop through resistor 17 which is large as compared to the voltage drop through resistors 23, 22. Hence, transistor 16 is "off" and does not shunt resistor 22.

If the base current of transistor 13 decreases because a signal element appears, the current (and therefore the IR drop) through the resistor 17 decreases and the potential at the base of transistor 16 becomes more negative. As soon as the base potential equals the potential of the emitter, the transistor 16 switches "on" then saturates, and shunts the resistance 22.

When the resistor 22 is shunted, the current flowing in the voltage divider circuit 20–23 increases. From then on the voltage drop at the terminals of resistor 20 increases so that the potential of the emitter of transistor 13 becomes more negative. This constitutes a positive feedback which automatically intensifies the action explained above until the current in the relay 19 winding is sufficient to operate it. The reverse phenomenon is produced when the negative voltage reappears at the base of transistor 13.

Another feature of the invention results from an association of capacitor 18 with the trigger circuit. The capacitor introduces a certain time constant in the potential variations appearing at the base of transistor 16. The aim thereof is to eliminate untimely operations of relay 19 in response to spurious signals of short duration which might tend to switch on transistor 8. For this purpose, the relative values of the elements 9, 10, 17 and 18 are so chosen that the time constant of the circuit formed by resistor 17 and capacitor 18 is slightly greater than the time constant of the circuit formed by resistor 9, and capacitor 10. Hence, after capacitor 10 is discharged in response to a spurious short pulse, not immediately followed by other pulses, it will be recharged more quickly than capacitor 18. Transistor 13 will switch "on" again before the charge of capacitor 18 has reached the value at which transistor 16 starts conducting.

It should be noted that the time constant of the elements 17 and 18 delays the operation of relay 19. The time constant of the elements 9 and 10 delays the release. Thus, the circuit tends to compensate for any delay of the relay operation. Due to this the alteration of the length of the signal element at the output of the receiver is practically negligible.

While the principles of the invention have been described above in connection with specific apparatus, it is to be clearly understood that this description is made only by way of example and not as a limitation on the scope of the invention.

We claim:

1. An alternating current signal receiver comprising an input circuit having a capacitor and a primary winding tuned to the frequency of said alternating current, a secondary winding inductively coupled to the primary winding, the mid-point of said secondary winding being connected to one end of a resistance in parallel with a capacitor ground being connected to the other end of said parallel circuit, means comprising a pair of diodes for coupling the two ends of said secondary winding to a control electrode of an electronic switching device, the time constant of the circuit formed by said resistance and said capacitor being equal to or greater than the damping time of any transient oscillations which are induced in said secondary winding when said alternating current terminates.

2. The alternating current signal receiver of claim 1 wherein said electronic switching device comprises a transistor operated in common base configuration and said control electrode comprises an emitter of said transistor, the base of said transistor being connected to said other end of said parallel circuit.

3. The alternating current signal receiver of claim 1 and means comprising another electrode of said switching device connected to a second time constant circuit, means also connected via a diode to the other electrode comprising a trigger circuit including a delay circuit for operating an electro-mechanical device, the time constant of said delay circuit being greater than that of said second time constant circuit, and means for back biasing said diode during a portion of an operating cycle for isolating said trigger circuit from other circuit components.

4. The alternating current signal receiver of claim 3 wherein said electronic switching device comprises a transistor, said control electrode comprises an emitter of said transistor, said other electrode comprises a collector of said transistor, and the base of said transistor is grounded.

5. The alternating current signal receiver of claim 3 wherein said trigger circuit comprises electronic switch means having an electrode connected to a third time constant circuit and to an electrode of a third electronic switch, at least a part of said third time constant circuit removed from said electrode being connected to said other end of said parallel circuit and means including a circuit extended through said electromechanical device and controlled by said third electronic switch for operating or releasing said device.

6. The alternating current signal receiver of claim 5 and a voltage divider, said second and third electronic switches being biased from said voltage divider circuit so as to form a positive feedback circuit.

7. The alternating current signal receiver of claim 5 wherein said second electronic switch comprises a transistor arranged in common emitter configuration and said electrode connected to said third time constant circuit is a collector.

8. The alternating current signal receiver of claim 7 wherein said third electronic switch comprises a transistor arranged in common emitter configuration, the base of said third switch transistor being connected to the collector of said second switch transistor, and said electromechanical device being connected to the collector of said third switch transistor.

9. The alternating current receiver of claim 8 and a voltage divider for providing biasing voltages for said second switch transistor and said third switch transistor, at least a portion of said voltage divider being connected between the emitter and the collector of said third switch transistor.

References Cited by the Examiner

UNITED STATES PATENTS

| | | | |
|---|---|---|---|
| Re. 21,659 | 12/40 | Adler | 317—147 X |
| 2,287,926 | 6/42 | Zepler | 317—142 X |
| 2,319,306 | 5/43 | Dickieson. | |
| 2,907,012 | 9/59 | Pitman et al. | 317—142 X |
| 3,078,444 | 2/63 | Druz et al. | 317—148.5 X |
| 3,079,465 | 2/63 | Simon et al. | |

SAMUEL BERNSTEIN, *Primary Examiner.*